April 17, 1962  R. SAUNDERS  3,029,968
CONTAINERS FOR PERISHABLE GOODS

Filed May 27, 1958  5 Sheets-Sheet 1

Inventor:
Ralph Saunders
By:
Baldwin & Wight
Attorneys

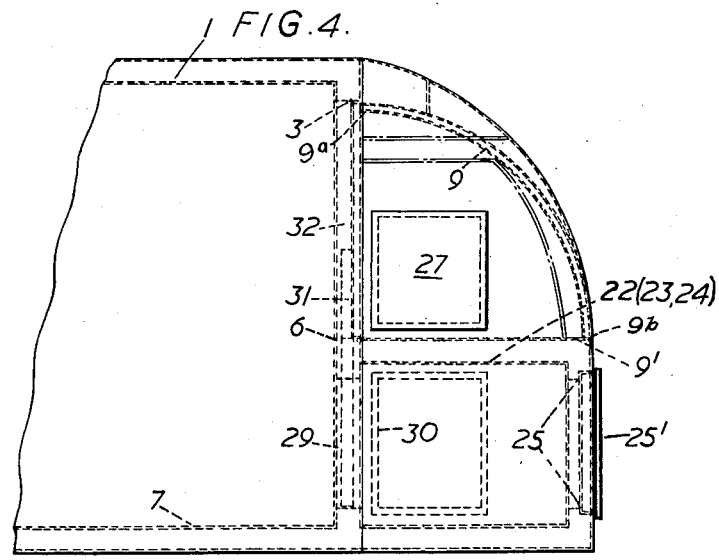
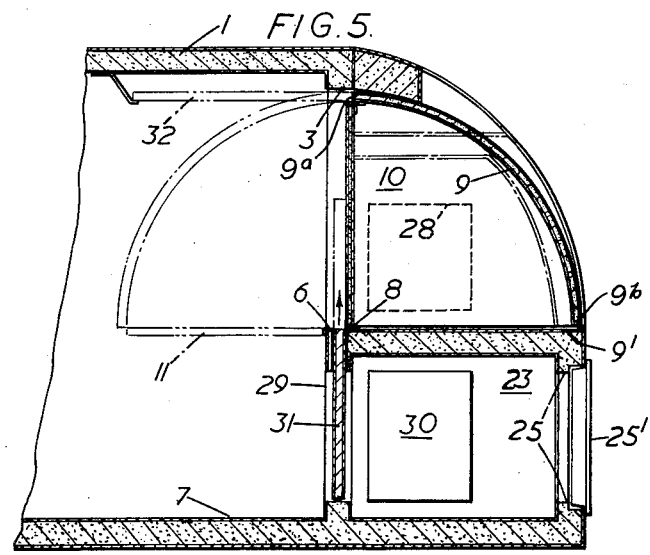

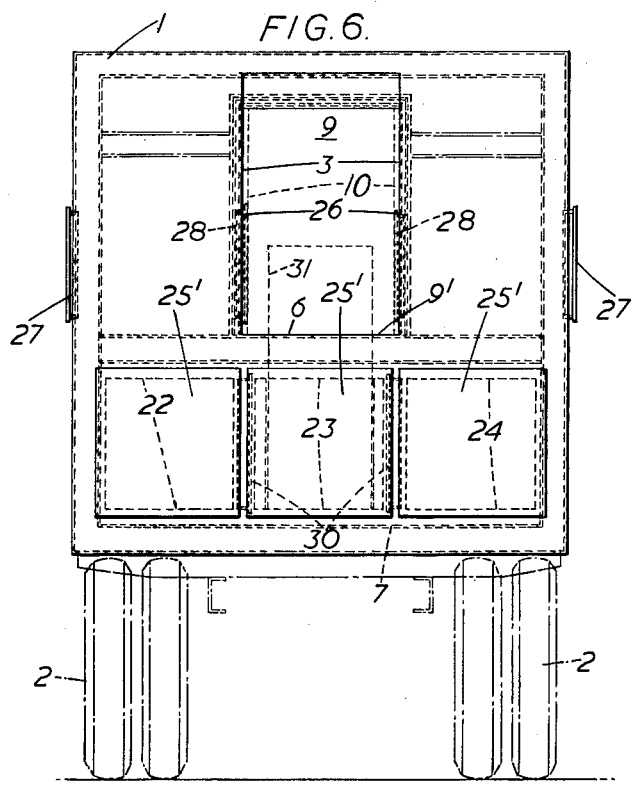
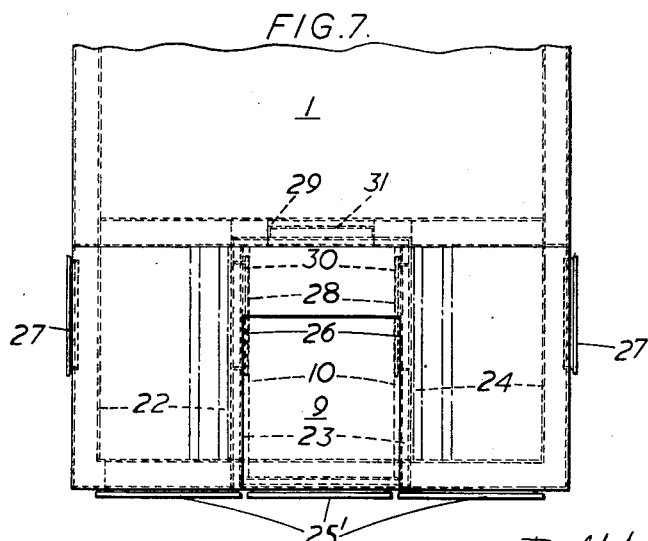

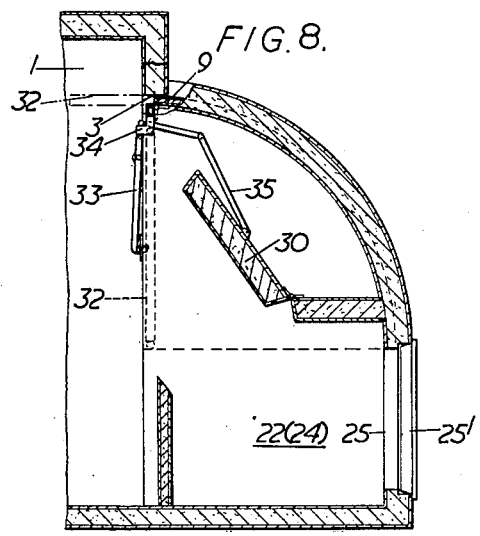
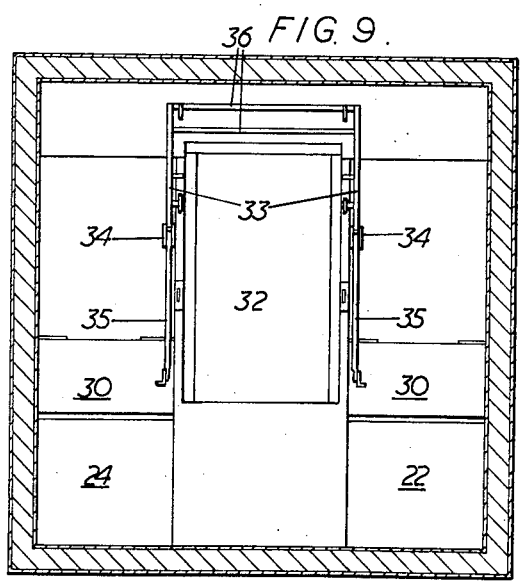

United States Patent Office 3,029,968
Patented Apr. 17, 1962

3,029,968
CONTAINERS FOR PERISHABLE GOODS
Ralph Saunders, Churt, near Farnham, England, assignor to Thermal Closures & Containers Limited, Mitcham, England
Filed May 27, 1958, Ser. No. 738,104
Claims priority, application Great Britain June 14, 1957
9 Claims. (Cl. 220—16)

This invention relates to the handling of foodstuffs and other perishable goods.

It is frequently required that such goods shall be pre-conditioned by cooling or heating in bulk and held in that condition in a container from which they are withdrawn as required. This involves the frequent opening of the container and this exposes the interior of the container to heat-exchange with the ambient atmosphere which in its turn causes the effect of the pre-conditioning of the goods remaining in the container to be dissipated.

The container can be insulated against heat exchange through its walls but the loss in this way is small over even an extended period as compared with the loss caused by the frequent opening of the container.

It is very desirable to effect the pre-conditioning at a central station but due to the defect referred to it is becoming increasingly common to equip the containers themselves with a cooling or heating plant so that the loss in the pre-conditioning can be made good. This, however, is an expensive solution to the problem.

As an example, reference will be made to the industry concerned with distributing frozen food products to retailers or customers.

It is common for such products to be placed for distribution within the body or container of a vehicle which is heat insulated and which may or may not be arranged to have its interior cooled (usually while the vehicle is standing at night) prior to its being loaded with the pre-frozen products: in some cases solid freezing agents such as $CO_2$ are distributed about the interior of the container.

In such a case, the latent heat condition of the product is relied upon to maintain it in the frozen condition against the action of ambient heat arising from the necessity for frequently opening the unloading door (or doors) of the container.

However, there is inevitably a progressive rise in temperature within the container and loss of the latent heat of the product and in the end a deterioration in its quality.

Now it is the main purpose of this invention to provide a container with a means of access such as to reduce the heat exchange at the time the container is opened so that the necessity for providing the container with its own conditioning plant is avoided while at the same time the condition of the pre-conditioned goods shall remain for a period which is amply sufficient for the purpose for which the container is used.

Broadly stated the present invention consists in providing, in a container for pre-conditioned goods and having an opening giving access to the interior of the container, closure means providing alternate closures at zones which are spaced apart to provide between them a receiving space for the user or for goods, the closure means being interconnected so that as one moves to close the space from the outside of the container the other moves to open the space to the interior of the container and vice-versa.

More particularly the invention can be stated as providing closure means arranged in spaced relationship on a component which defines in part a receiving space to receive the user or goods and which is movable to bring the closure means alternately into position to close the space at one end from outside the container and to open the space at the other end to the interior of the container and vice-versa.

In this way the heat inter-change between the interior of the container and the ambient atmosphere is considerably reduced for by proper manipulation the two have hardly any direct communication occasioned by the user entering or leaving the container.

Thus the major cause of heat exchange between the interior of the container and the ambient atmosphere is greatly reduced and renders unnecessary the fitting of the container with its own cooling or heating plant while yet at the same time enabling the goods to be maintained in condition for long periods.

The invention can be carried into effect by providing a hood or canopy which in one position extends into the container and prevents the user from entering it as well as making a closure against a first component; the hood is disposed to be moved by the user, when in position to make an entry, to extend over him and to make a closure against a second closure component which is disposed behind the user as he passes under the canopy into the container.

It is also of advantage to arrange the lower edge of the entry opening well above the floor of the container. In this way, the wall of the container about the lower edge of the opening forms a sill or barrier to the displacement of cold air from the interior by the entry of warmer outside air, this cold air being heavier than the ambient air and therefore lying to the floor of the container. The height of the sill should be of the order of say at least 2'6" above the floor.

The container could also be provided with an additional opening or openings which are normally closed by closures operable from outside the container, these openings being provided to enable goods in the container to be removed as required: by this means, the user being once inside the container can dispose the goods in position in which they can be reached through these removal openings: these openings would not require to have a large area comparable with that required for the main openings which has to be sufficiently large to enable the user to pass through it. The heat interchange via these removal openings would thus be small when the external closures are opened: however even that can be reduced by closures operable from inside the container.

The invention is illustrated by way of example in the accompanying drawings, in which:

FIGURE 4 is a side elevation of the rear end of a container embodying the invention in another form;

FIGURE 5 is a sectional elevation of the construction shown in FIGURE 4;

FIGURE 6 is an end elevation of the construction shown in FIGURE 4;

FIGURE 7 is a plan view of the construction shown in FIGURE 4;

FIGURE 8 is a sectional elevation of the rear end of a container embodying the invention and including an interlocking device to ensure proper operation of container closures; and FIGURE 9 is a transverse sectional elevation of the construction shown in FIGURE 8.

Figure 1:
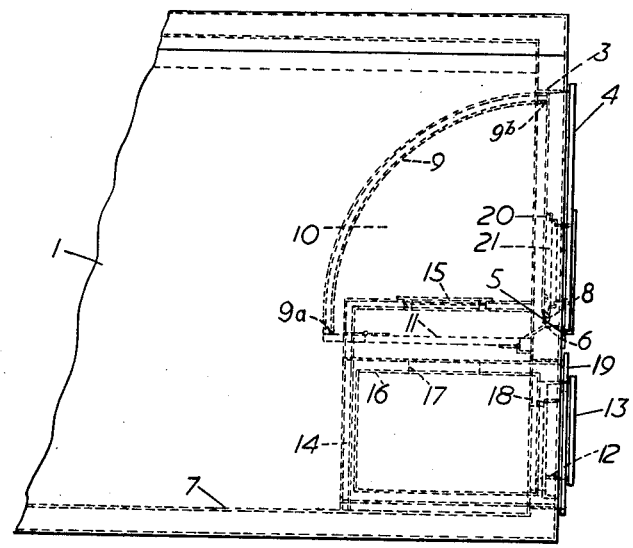
FIGURE 1 is a side elevation of the rear end of a container embodying the invention in one form.
Figure 2:
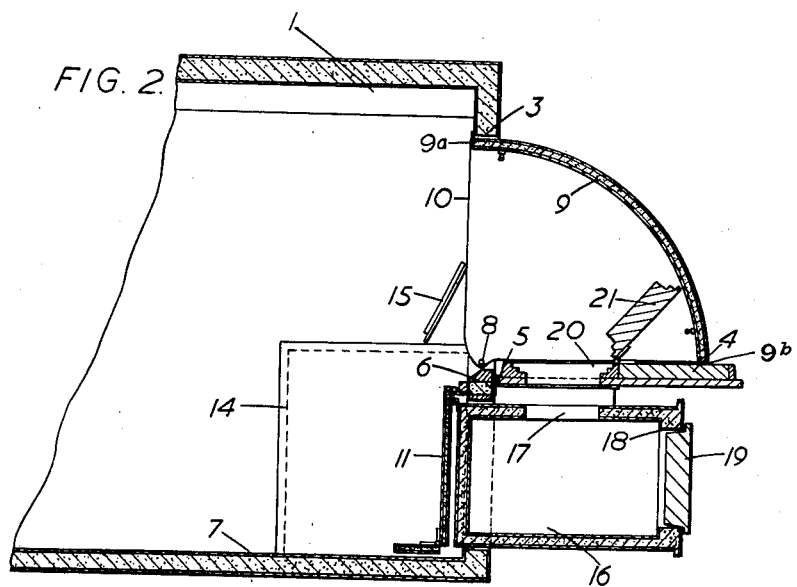
FIGURE 2 is a sectional elevation of the construction shown in FIGURE 1, but showing certain parts in different positions.
Figure 3:
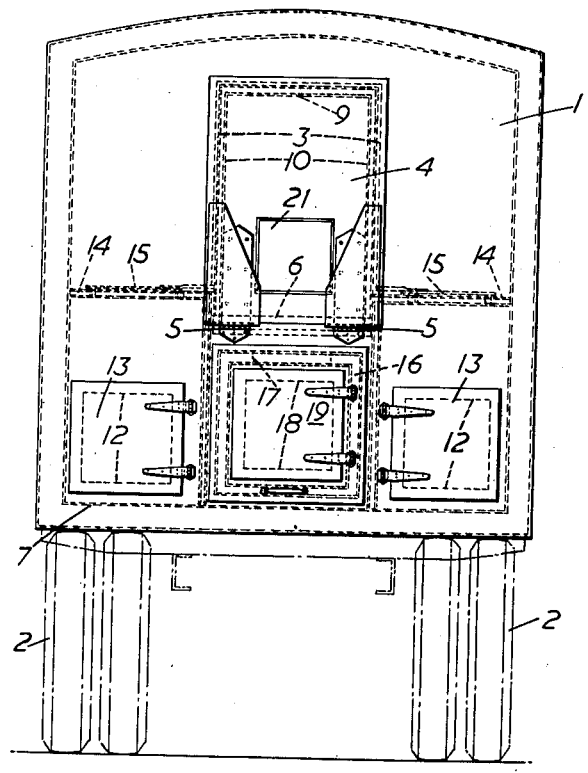
FIGURE 3 is an end elevation of the construction shown in FIGURE 1.

Referring firstly to FIGURES 1–3, the container in the illustration comprises the body 1 of a vehicle having wheels 2, the vehicle usually being self-propelled.

The container is loaded with goods which may be already pre-conditioned or may be so treated while in the container at a central conditioning station. The invention is mainly concerned with preventing loss of the pre-conditioned nature of the goods due to the removal of goods from the containers as and when required.

For this purpose the body of the container has a main opening 3, by which the user can enter the interior of the container to handle the products. This opening is indicated at 3 and is, in the particular case shown, formed in the rear wall. This opening is normally closed by an insulated closure flap 4 hinged at 5, the sill 6 of the opening to which the closure is hinged being well above the floor 7 of the container which would have its walls fitted with thermal insulation.

Also hinged at 8, at about the level of the sill 6, is a canopy 9 having a ceiling and side walls 10. The two ends 9ᵃ and 9ᵇ of the ceiling constitute end closures which respectively engage a flap on platform portion 11 and the flap or platform portion 4 which extends as a continuation of the platform portion 11, the platform as a whole extending through the main opening 3. The canopy is normally positioned in the interior of the container as is shown in dotted lines in FIGURE 1, at which time its end rim 9ᵃ is engaged by the flap 11 of the platform, which flap is spring biased to that position so as thereby to close the interior of the container 1 from outside.

When the user intends to enter the container, he first moves the flap 4 from the position shown in FIGURE 1 to the position shown in FIGURE 2. He then sits on the flap and moves his legs through the now opened opening 3. It is to be noted that the flap 11 cooperates with the canopy 9 to maintain a closure for the interior of the container even when the flap 4 is opened; this closure is broken when the user moves his legs through the opening, at which time the flap 11 is pressed down to the position shown in FIGURE 2: however, at this time the user swings the canopy 9 over him from the position shown in FIGURE 1 to the position shown in FIGURE 2, when the closure which was made by the flap 11 at the end 9ᵃ of the canopy in front of the user is transferred to the closure made by the flap 4 and the end 9ᵃ of the canopy 9, i.e. at a zone behind the user.

In this way, therefore, the possibility of heat exchange between the interior of the container 1 and the ambient atmosphere is reduced to a minimum at a time when it is necessary for the user to enter the container for the purpose of handling the pre-conditioned goods inside. It will be clear that a similar action will occur when the user makes his exit from the container.

In order to further the object of this invention, openings 12 are provided to enable goods to be removed from outside the container 1: these openings are normally closed by closures 13 which can be operated from outside the container 1. The user, when once inside the container 1 disposes goods selected from those stacked inside the container in a position adjacent the openings 12 so that the user, when again outside the container, can remove the goods by opening the closures 13.

It is preferred, as is shown, to provide the removal openings 12 in insulated holders 14 having closures 15. Thus the user, while inside the container would open the closures 15 and charge the holders 14 after which the closures 15 would be closed and the goods removed when required by opening the closures 13.

The holders 14 are for convenience disposed at the sides of the main opening 3: as shown, a further holder 16 can be arranged below and in line with the main opening 3 but in this case the holder is arranged to be slid from within the container 1 so as to provide room for the user to pass into and out of the container as has been described. To enable this holder 16 to be loaded with goods, it is provided with a charge opening 17 and with a removal opening 18 which is closed by a closure 19 accessible from outside the container 1. When this holder is withdrawn to the position shown in FIGURE 2, the charging opening 17 registers with an opening 20 in the flap 4 when in the lowered position, this opening being normally closed by a closure 21 which is operated by the user while he is inside the container 1 when he intends to load the holder 16 with goods which are removed when required through the opening 18.

As will be clear, the container 1 provides an arrangement which will reduce to a minimum the loss of condition of pre-conditioned goods in the container 1 despite the necessity for the user to enter the container for the purpose of removing the goods for separate use or delivery.

Obviously the arrangement of the container 1 can take other forms while still retaining the benefits of the invention: thus another arrangement is shown in FIGURES 4–7.

In this modified arrangement, the canopy 9 is again employed but instead of using the flap 4 the closure 9ᵇ of the canopy normally closes the container 1 against a static wall 9′ on an extension or platform portion which is sub-divided to provide three holders 22, 23 and 24 equivalent to the holders 14 and 16 and each having rear removal openings 25 having closures 25′.

In this case the canopy moves in an aisle space 26 which is closed by the canopy when it is in the position shown in FIGURE 5 at which time the end closure 9ᵇ closes against the platform portion 9′. The user can gain access to this aisle space by moving the canopy 9 to the dotted line position shown in FIGURE 5 at which time it transfers the closure from the end closure 9ᵇ and platform portion 9′ to the end closure 9ᵃ and a flap or platform portion 11 corresponding to the flap 11 of FIGURES 1–3 which, as has been described, is spring loaded so that it can give way to the legs of the user to enable him to enter the container 1 after he has pulled the canopy 9 back over him to restore the closure against the wall 9′.

These figures also show an arrangement by which pre-conditioned goods can be received and stowed in the container 1; for this purpose the side walls of the container are provided with loading openings which are normally closed by closures 27, the openings registering with openings which are formed in the walls of the aisle space, these latter openings being normally closed by closures 28.

Thus, goods can be loaded with the assistance of the user while inside the container 1 and under the canopy 9 by passing them through the openings when uncovered by closures 27 and 28, the goods being received on the top wall of the container 23.

The user would dispose the goods as required in the container 1. When now the goods are to be withdrawn, the goods which are next required are placed into the holders 22, 23 and 24: to effect this, the holder 23 is provided with a rear opening 29 through which goods can be passed into the holder 23 itself and through removable closures 30 into the holders 22, 24 whence they can be removed as required from outside the container 1 by opening the closures 25′.

To prevent heat exchange via the opening 29 while the user is gaining access to the interior of the container, that opening 29 is closed by a sliding door 31 which must be moved down (to close the opening) before the user can enter the container, or in the reverse action, before he can leave the container.

A flap 32 can also be provided to enable the user to close the canopy 9 from the interior of the container 1 while he is within it.

The holders 22 and 24 can be modified by being extended vertically upwards so that they occupy sensibly the full height of the aisle space.

The various closures and especially the external closures 13 and 19 of FIGURES 1–3 and the closures 25′ and 27 of FIGURES 4–7 could be of the automatic self-closing type which can give way to the arm of the operative at the time of loading or unloading.

In the arrangement so far described reliance has to be placed on the user closing the closures to the holders before he leaves the container so as to minimize heat exchange via the holders i.e. the user is relied upon to close the closures 15 of the holders 14 of the construction shown in FIGURES 1–3 and the closures 30 of the holders 22, 24 in the arrangement shown in FIGURES 4–7.

The invention also consists in making provision for reducing or eliminating the loss of condition of the goods in the container due to careless use of the apparatus by the user. This is achieved by interlocking the closures of the holders with a component which bars exit from the container 1 in such a manner that the user cannot move out of the container until the closures are closed.

This result can be achieved in various ways.

One arrangement is shown in FIGURES 8 and 9 as applied to a construction similar to that shown in FIGURES 4–7. Thus a component 33 is pivotally supported at 34 at each side of the exit opening 3 of the container 1. This component is connected by links 35 to the closures 30 of the holders 22, 24 and the component has crossbars 36. So long as the closures 30 are closed, the component 33 is in the raised position shown in FIGURE 9 so that the cross-bars 36 are held clear of the opening 3 and do not bar exit from or access to the container 1 through the opening. When however the closures 30 are opened, the component 33 has to be swung down to the position shown in FIGURE 8 in which position the cross-bars 36 lie across the opening 3 and prevent exit through the opening 3. If, as is shown the flap 32 is provided, that flap cannot be moved to uncover the exit 3 unless the closures 30 are closed so that the cross-bars 36 are clear of the flap.

Alternatively, the mechanical interlock could consist of bolts to prevent the opening of the various closures 30 but which are moved through a mechanical transmission away from the closures when a component such as the component 32 is moved to barring position.

Again the opening of the various closures 30 can be prevented normally by catches which are released only when a component such as the component 33 is moved to its exit barring position in such a case, a Bowden or other flexible transmission could be used or if desired the catches can be operated through an electric or a fluid transmission.

The various movable parts controlling access to or exit from the container could be arranged for power operation as by electric motors: in such a case the interlock between the different parts could be achieved by electrical interlocks.

It is to be emphasized that the term "container" is intended to include any receptacle for preconditioned goods whether it be static or transportable, and including large static cold storage erections to receive vehicles through openings controlled by the closure means of this invention.

I claim:

1. A thermally insulated container having an opening giving access to the interior of the container and having a platform extending through the opening and comprising a first portion extending from said opening into the interior of said container and a second portion extending from said opening as a continuation of said first portion outwardly beyond said container, a closure device mounted on said container to move in the opening and which defines with the platform a receiving space, the said device making sliding closing engagement with the wall of the opening and having alternately acting closures respectively cooperable with said first and second platform portions to close and open the receiving space to the interior of the container and to open and close the space from the exterior of the container and vice-versa.

2. A container which is thermally insulated and which has an opening giving access to the interior of the container and having a platform extending through the opening and comprising a first portion extending from said opening into the interior of said container and a second portion extending from said opening as a continuation of said first portion outwardly beyond said container, a closure means for the opening comprising a canopy having side walls and a curved wall mounted in said container to swing through the opening with its side and curved walls making sliding closing engagement with the walls of the opening, the said canopy being hollow to define a receiving space and the canopy having end closures cooperable respectively with said first and second platform portions respectively alternately to open and close the receiving space through the opening to the interior of the container and close and open the space to the exterior and vice-versa.

3. A container as claimed in claim 2 and wherein one of the platform portions comprises a component which is disposed on the inner side of the opening and is formed to yield to the user in making entry to the container.

4. A container as claimed in claim 2 and equipped within the container with a product holder having a charge opening accessible from within the container and a removal opening accessible from outside the container, and wherein the charge and removal openings are equipped with closure devices accessible respectively from inside and outside the container.

5. A container as claimed in claim 4 and comprising means interlocking the position of the closure means for the opening to the container and the position of the closure device for the holder.

6. A container as claimed in claim 2 and wherein the lower boundary of the entry opening to the container is a substantial distance above the floor of the container.

7. A container which is thermally insulated and has an opening giving access to the interior of the container, a platform comprising a first portion extending from said opening into the interior of said container and a second portion extending from said opening as a continuation of said first portion outwardly beyond said opening, walls cooperating with said platform to define an aisle space extending outwardly from and registering with the opening, and a closure device which is hollow to define with the aisle space a receiving compartment, the said closure device being movable in and making sliding closure engagement with the walls of the aisle space and the closure device having end closures cooperable with said first and second platform portions respectively alternatively to open and close the receiving compartment through the opening to the interior of the container and to close and open the compartment from the exterior and vice-versa.

8. A container as claimed in claim 7 and having also a removal opening equipped with a closure operable from outside the container.

9. A container which is thermally insulated and has an opening giving access to the interior of the container, a platform comprising a first portion extending from said opening into the interior of said container and a second portion extending from said opening as a continuation of said first portion outwardly beyond said opening, walls cooperating with said platform to define an aisle space extending outwardly from and registering with said opening, and a closure device in the form of a canopy which is mounted to swing in the aisle space and through the opening, the canopy being hollow and defining with the aisle space a receiving compartment and the canopy having side walls and a curved wall making sliding closing cooperation with the walls of the opening and having end closure surfaces cooperable with said first and second platform portions respectively alternatively to open and close the receiving space to the interior of the container and at the same time to close and open that space from the exterior and vice-versa.

References Cited in the file of this patent
UNITED STATES PATENTS

| | | |
|---|---|---|
| 697,655 | O'Leary | Apr. 15, 1902 |
| 1,169,606 | Blank et al. | Jan. 25, 1916 |